United States Patent [19]

Chambers et al.

[11] 4,275,647
[45] Jun. 30, 1981

[54] APPARATUS FOR PRODUCING A CENTERFILLED FOOD PRODUCT

[75] Inventors: Lee Chambers, Groveland; Melvin E. Ellertson, Northridge, both of Calif.

[73] Assignee: Carnation Company, Los Angeles, Calif.

[21] Appl. No.: 75,614

[22] Filed: Sep. 14, 1979

Related U.S. Application Data

[63] Continuation-in-part of Ser. No. 787,697, Apr. 14, 1977, abandoned.

[51] Int. Cl.$^3$ .................... A47J 37/00; A21C 3/04
[52] U.S. Cl. ........................... 99/339; 99/354; 99/355; 99/356; 99/427; 99/443 C; 99/450.6; 99/450.7; 426/94; 426/138; 426/283; 426/284
[58] Field of Search ............... 99/339, 352, 353, 354, 99/355, 443 C, 386, 391, 441, 356, 357, 442, 450.6, 450.7, 422, 423, 426, 427; 426/94, 103, 282, 283, 138, 279, 549, 553, 560, 274; 425/224, 463

[56] References Cited

U.S. PATENT DOCUMENTS

| | | | |
|---|---|---|---|
| 2,532,131 | 11/1950 | Van Voorst | 425/463 |
| 2,674,958 | 4/1954 | Puls | 99/450.6 |
| 2,905,105 | 9/1959 | Lombi | 99/450.6 |
| 2,960,045 | 11/1960 | Pentzlin | 426/282 X |
| 3,029,749 | 4/1962 | De Jersey | 99/450.7 |
| 3,477,851 | 11/1969 | Benson | 426/283 X |
| 3,480,445 | 11/1969 | Slaybaugh | 426/284 |
| 3,494,303 | 2/1970 | Shiffer | 99/450.6 |
| 3,538,859 | 11/1970 | Alt | 99/442 |
| 3,615,147 | 10/1971 | Hayashi | 99/450.7 |
| 3,615,675 | 10/1971 | Wisdom | 426/94 X |
| 3,747,508 | 7/1973 | Elam | 99/450.6 |
| 3,764,715 | 10/1973 | Henthorn | 426/283 |
| 3,894,159 | 7/1975 | Franta | 426/284 |
| 3,916,029 | 10/1975 | Hildebolt | 426/94 |
| 3,917,861 | 11/1975 | Viera | 426/274 |
| 3,937,852 | 2/1976 | Wolf | 426/560 |
| 3,942,929 | 3/1976 | De Mets | 425/224 X |
| 3,965,807 | 6/1976 | Baker | 99/423 X |
| 3,988,098 | 10/1976 | Kato | 425/224 |
| 4,162,333 | 7/1979 | Nelson | 99/450.7 |

Primary Examiner—Billy J. Wilhite

[57] ABSTRACT

Apparatus for producing a tubular centerfilled food product having a rigid, friable baked outer shell and a core of edible filling material by a continuous, straight-through process. A semi-liquid batter having a relatively high content of mono-and/or disaccharides is carried between a pair of spaced apart heated moving surfaces and baked to form a continuous, elongated flat thermoplastic sheet having a controlled thickness. The continuous thermoplastic sheet is rolled around its longitudinal axis while warm and pliable to form a continuous tube having a closed longitudinal, non-overlapping seam. As the baked sheet is rolled around its longitudinal axis, a viscous edible filling material is injected into the core of the continuous tube as it is formed. The filled tube is cooled until the outer shell becomes rigid and is then cut into pieces of a desired length.

15 Claims, 11 Drawing Figures

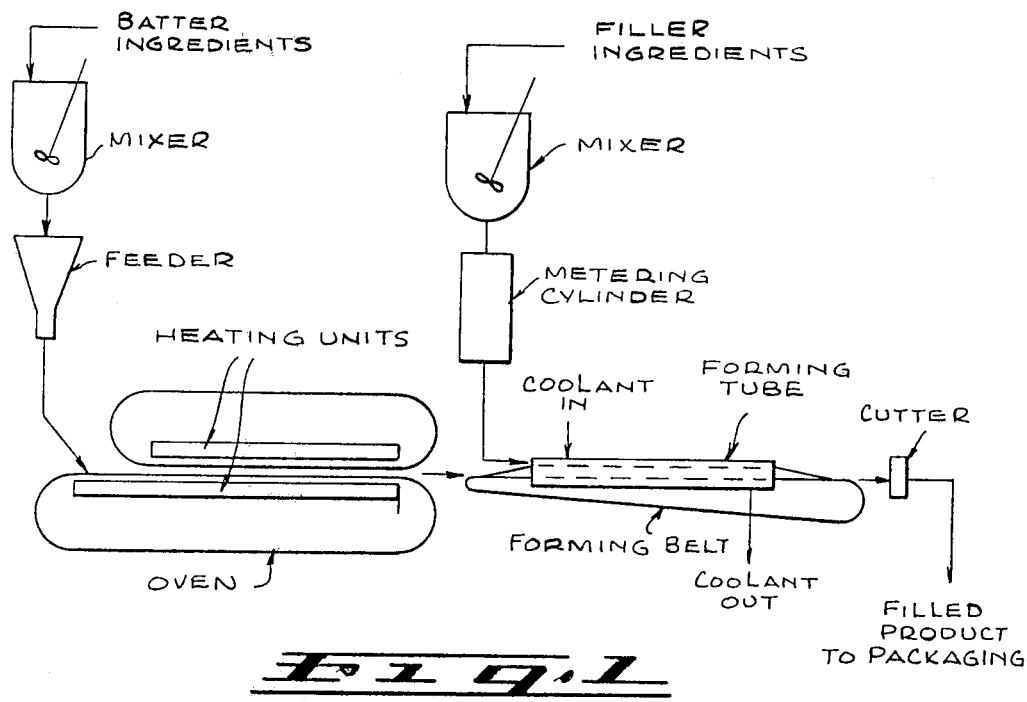
Fig. 1
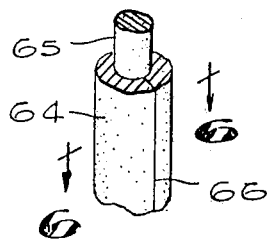
Fig. 5
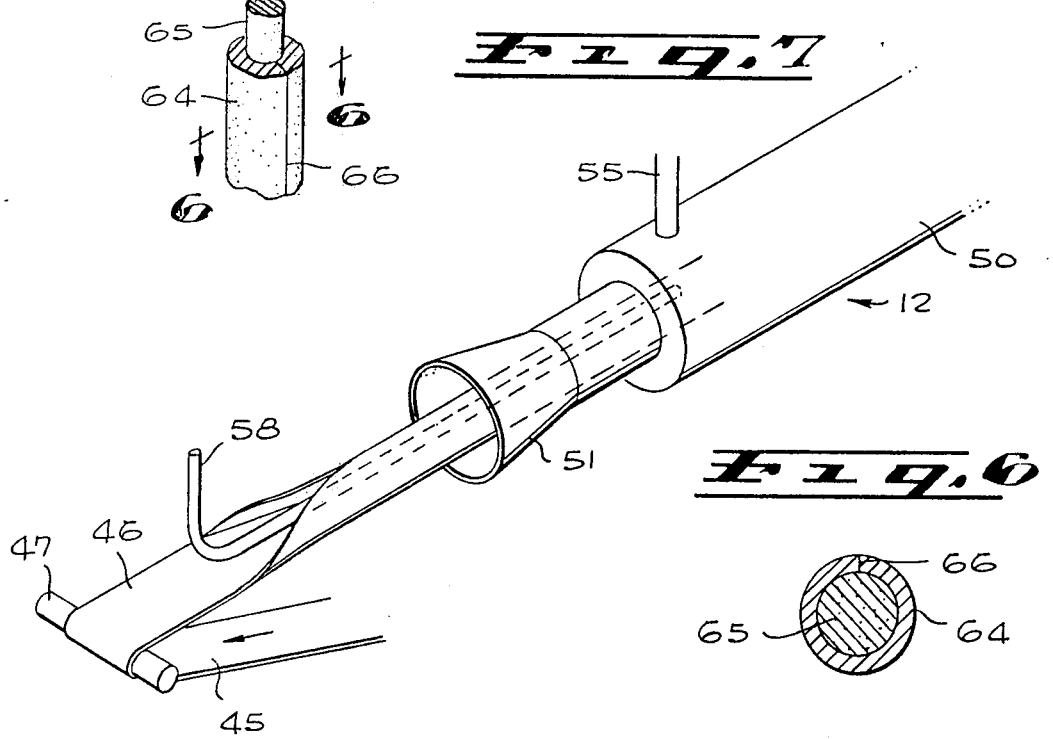
Fig. 7
Fig. 6

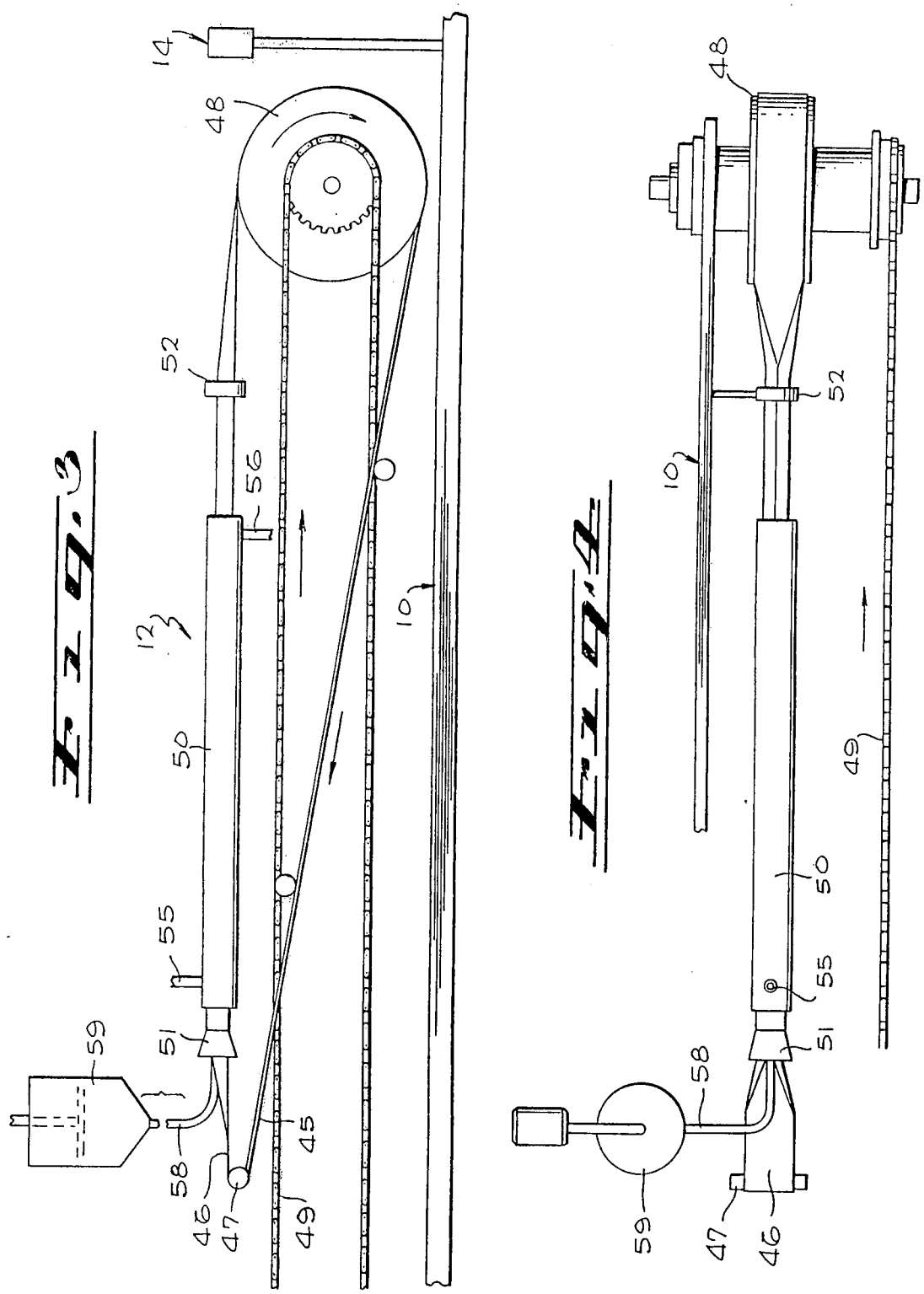

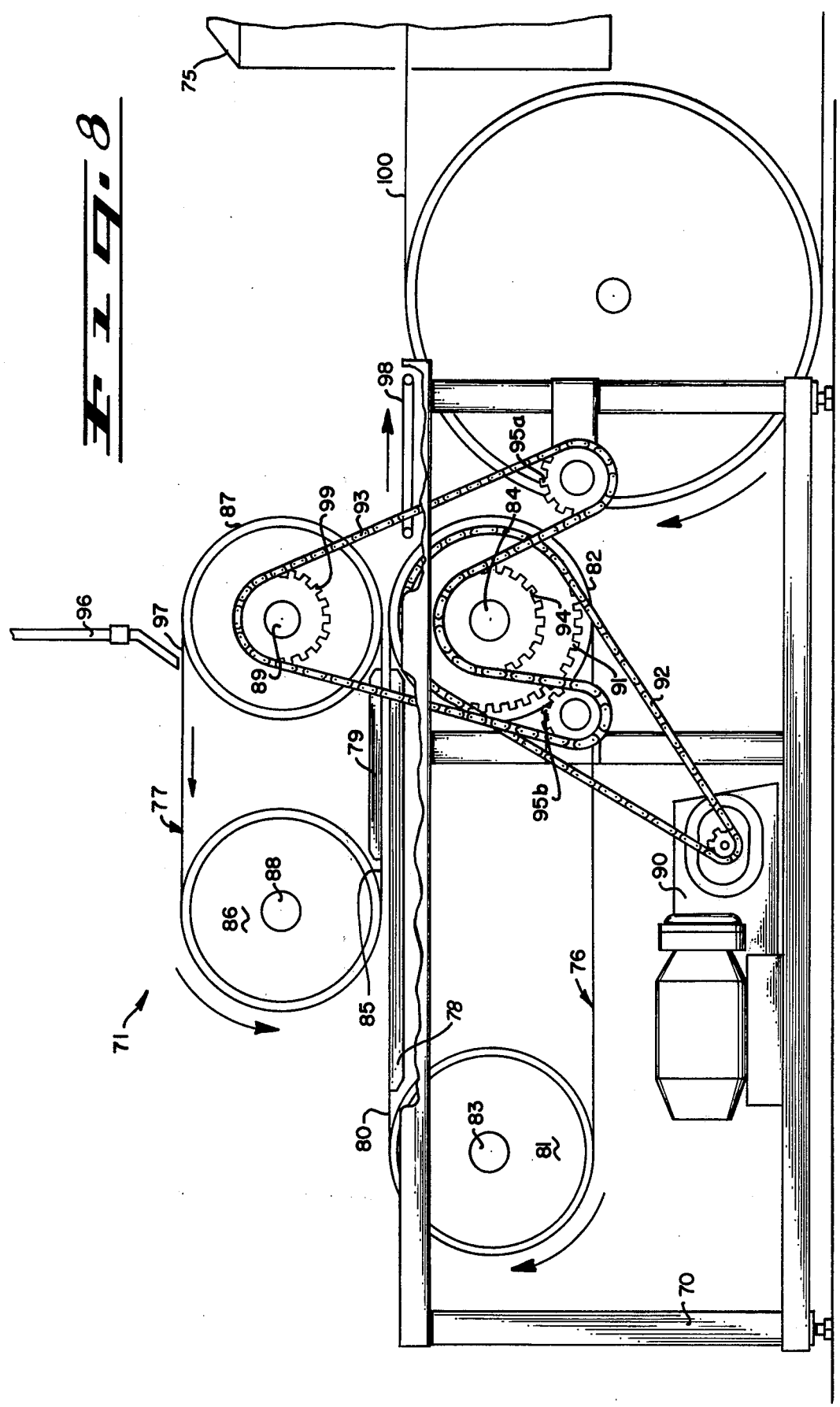

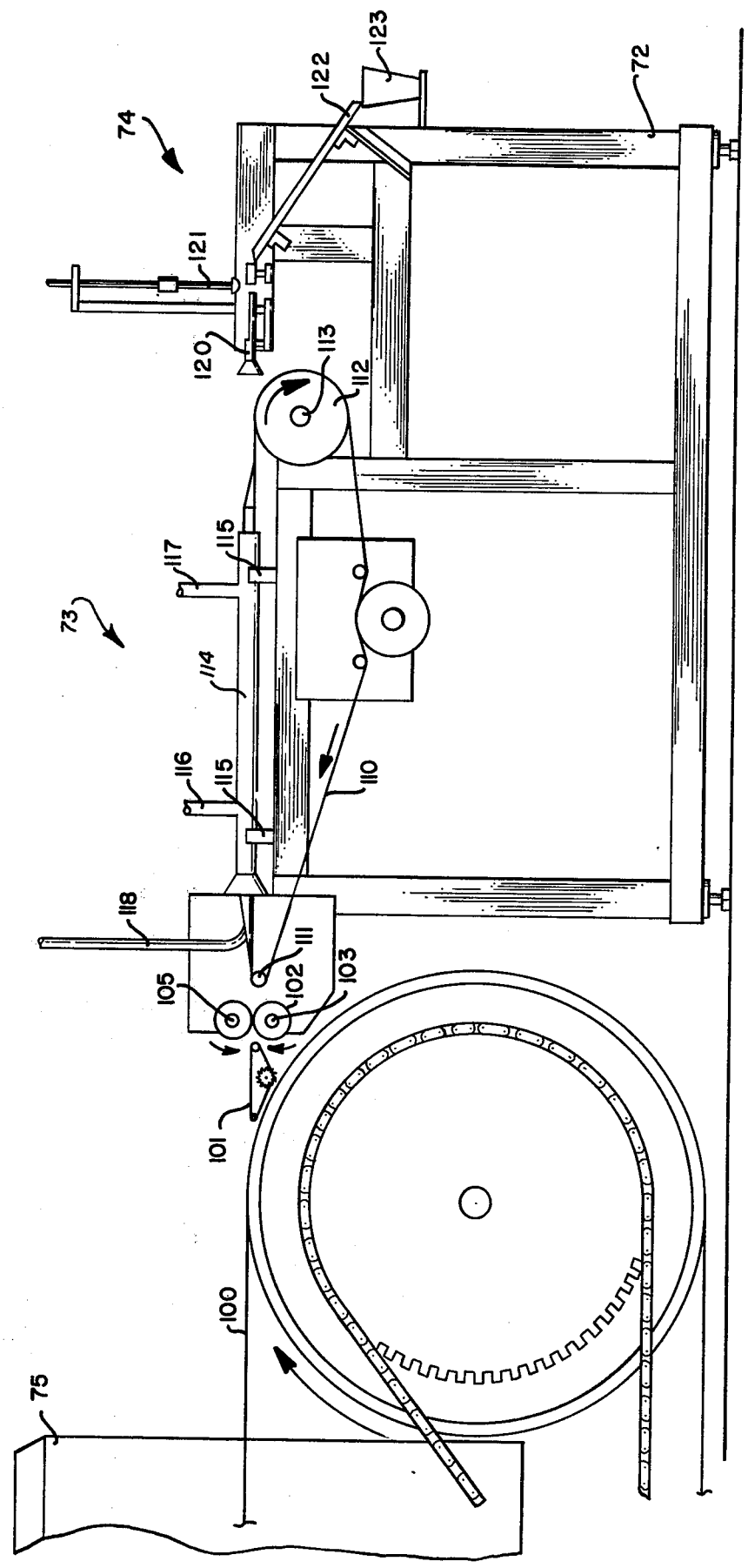

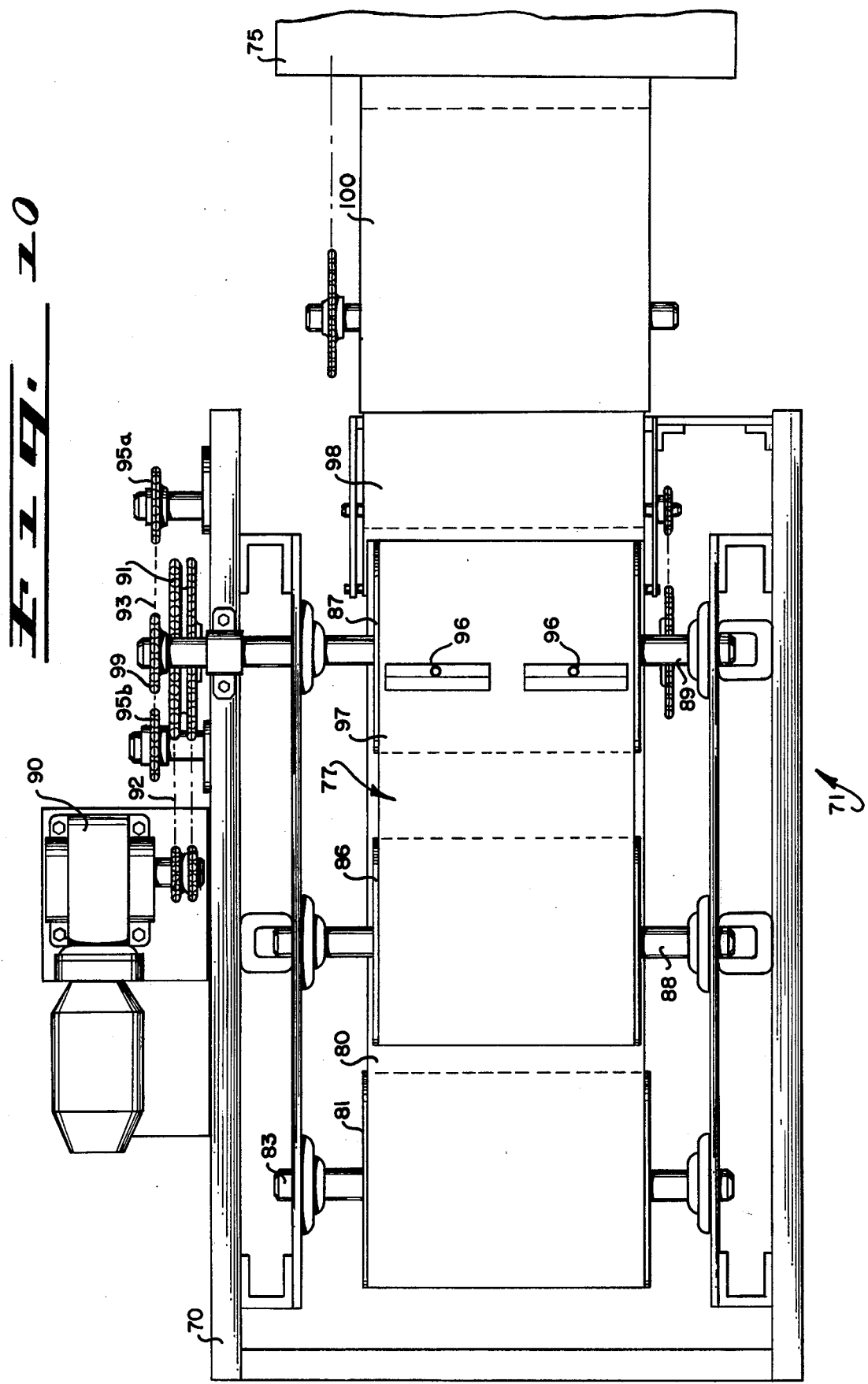

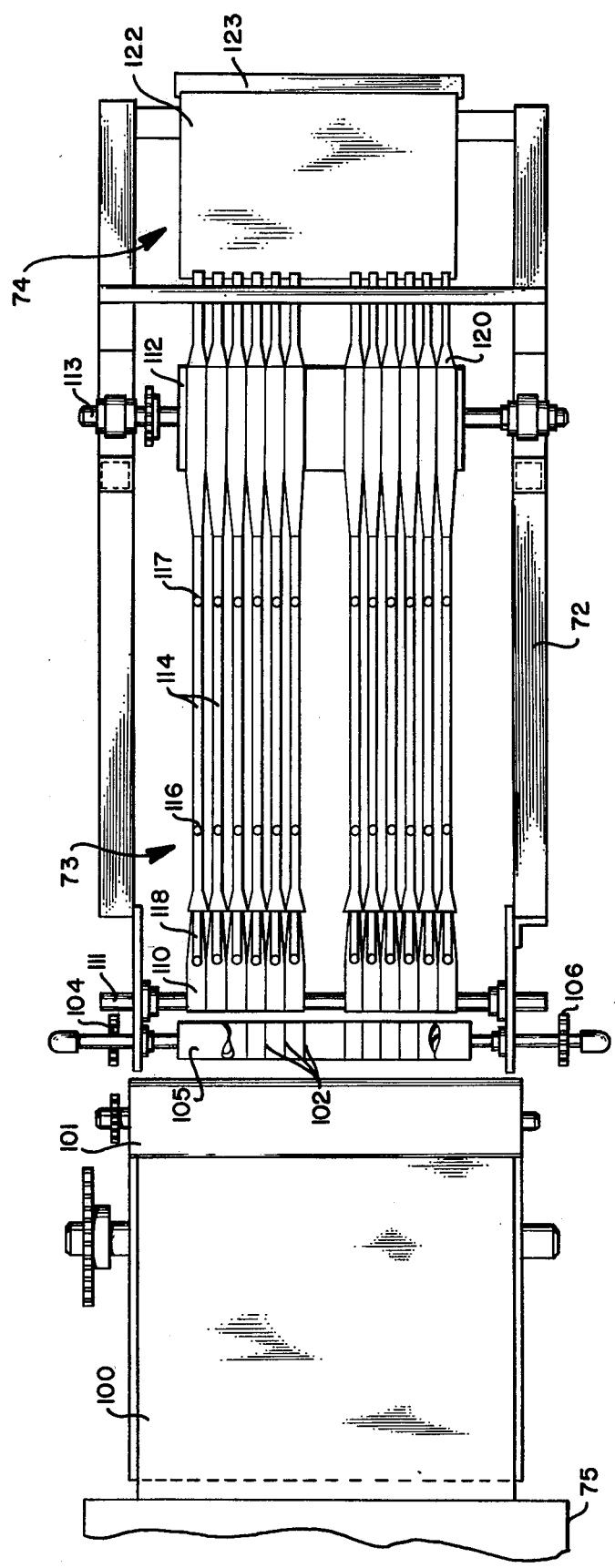

APPARATUS FOR PRODUCING A CENTERFILLED FOOD PRODUCT

RELATED APPLICATIONS

This is a continuation-in-part of co-pending application Ser. No. 787,697, filed Apr. 14, 1977, now abandoned.

BACKGROUND OF THE INVENTION

This invention relates to apparatus for the continuous production of a novel centerfilled food product. More particularly, the invention is directed to apparatus for producing a tubular centerfilled food product, having a rigid, friable, thermoplastic baked outer shell and a core of edible material surrounded by the shell, in a continuous, straight-through process.

A number of methods and apparatus have been used heretofore to provide cylindrical centerfilled food products. Such prior methods frequently have involved extrusion apparatus for extruding a mixture of a farinaceous material and water through a restricted orifice into a tubular configuration, under conditions such that the tubular product is puffed or expanded as it emerges for the orifice. The tubular product is cut to length and cooled, and a desired filling is injected into the core of the puffed tubular body. Such apparatus and methods suffer from the disadvantage that a number of separate steps are involved, each requiring separate handling of the fragile expanded tubular product. Also, because of the high temperatures and pressures to which the mix is subjected in the extruder, the ingredients which may be used in the mix are limited. For example, if the mix has a sugar content of above about 10%, the product tends to scorch or burn during passage through the extrusion apparatus. As a result, such expanded, extruded products must have a shell which consists essentially of cereal.

Another procedure which has been disclosed heretofore involves mounting a plurality of cylindrical molds on an endless conveyor, each of the molds having a rod extending horizontally into its interior. A dough is filled into the mold, and the mold carried into an oven for baking. The baked dough tubes are then stripped from the rods and held in a suitable manner to permit filling. This procedure also suffers from the disadvantage that separate shell forming and filling steps are required, each requiring separate handling of the product.

It is readily apparent that a process and apparatus for making baked centerfilled food products in which the shell is filed simultaneously with its formation would be desirable for it would reduce the number of handling steps involved. Heretofore the only procedure disclosed for such a simultaneous shell forming and filling operation involves a co-extrusion operation in which a shell of cereal dough is extruded around a core of a filling material. However, as noted above, due to the temperatures and pressures to which materials are exposed in the extruder, the ingredients which can be used in such a co-extrusion operation are restricted to thereby limit the type of products produced.

SUMMARY OF THE INVENTION

Briefly, the product of the present invention is a baked, centerfilled product which comprises a rigid tubular thermoplastic shell of baked comestible material having a closed longitudinal, non-overlapping or butted seam and a core of edible material such as confectionary creme, fruit paste, meat paste and the like, surrounded by the tubular shell.

The method of this invention involves baking a continuous layer of a semi-liquid batter mixture having a relatively high content of mono-and/or disaccharides to form a continuous ribbon or sheet having a controlled thickness, the continuous sheet being thermoplastic, that is, it is flexible and pliable while at a temperature of about 212° F. and above, due to its high mono-and/or disaccharide content. The continuous baked sheet, while warm and pliable, is rolled around its longitudinal axis until the edges of the sheet are butted together to form a continuous tube having a closed longitudinal, non-overlapping seam. A viscous edible material having a low water activity (Aw) is injected or otherwise deposited into the core of the continuous baked tube, as the tube is formed to fill the core, and the centerfilled tube is cooled. Upon cooling, the baked outer shell becomes rigid, crisp and friable so that it retains its tubular shape without opening of the closed butted seam. The cooled, centerfilled tubular product is then cut into pieces of desired lengths.

The apparatus of the present invention includes a pair of heated opposed moving surfaces vertically spaced apart a slight distance, which are adapted to receive a semi-liquid batter and form the batter into a continuous layer having a controlled thickness, and heating means to bake said batter layer into a continuous strip or sheet having a substantially uniform predetermined thickness. Tube forming means are positioned adjacent the heating means to receive the continuous sheet of baked material discharged from the heating means while the baked sheet is still in a plastic or pliable state. The tube forming means is adapted to roll the continuous sheet around its longitudinal axis until the edges of the sheet are butted together to thereby form a continuous tube having a longitudinal, butted or non-overlapping seam. A filling tube extends axially into the tube forming means to a point beyond which the edges of the baked sheet are butted together, for filling the core of the continuous tube with a viscous edible material which sets up or solidifies upon cooling. The centerfilled tube is retained in the tube forming means until the baked outer shell has cooled sufficiently to become rigid and friable and the filling has set up sufficiently to be retained in the shell. A cutter is positioned adjacent the discharge end of the tube forming means for cutting the continuous centerfilled tube into pieces of desired lengths.

BRIEF DESCRIPTION OF THE DRAWING

FIG. 1 is a schematic drawing illustrating an embodiment of the present invention.

FIG. 3 is a side elevational view of apparatus in which a continuous baked thermoplastic sheet is formed into a continuous centerfilled tube.

FIG. 4 is a top plan view of the apparatus of FIG. 3.

FIG. 5 is a fragmentary perspective view of a product of the present invention.

FIG. 6 is a cross-sectional view of the product taken along lines 6—6 of FIG. 5.

FIG. 7 is a fragmentary perspective view of the tube forming and filling apparatus of this invention.

FIG. 8 is a side elevational view of another embodiment of the portion of the apparatus in which a semi-liquid batter is formed into a continuous layer having a controlled thickness.

FIG. 9 is a side elevational view of another embodiment of the portion of the apparatus in which a continuous baked thermoplastic sheet is formed into a tubular centerfilled food product.

FIG. 10 is a top plan view of the apparatus of FIG. 8.

FIG. 11 is a top plan view of the apparatus of FIG. 9.

DETAILED DESCRIPTION OF THE INVENTION

Figure 2:
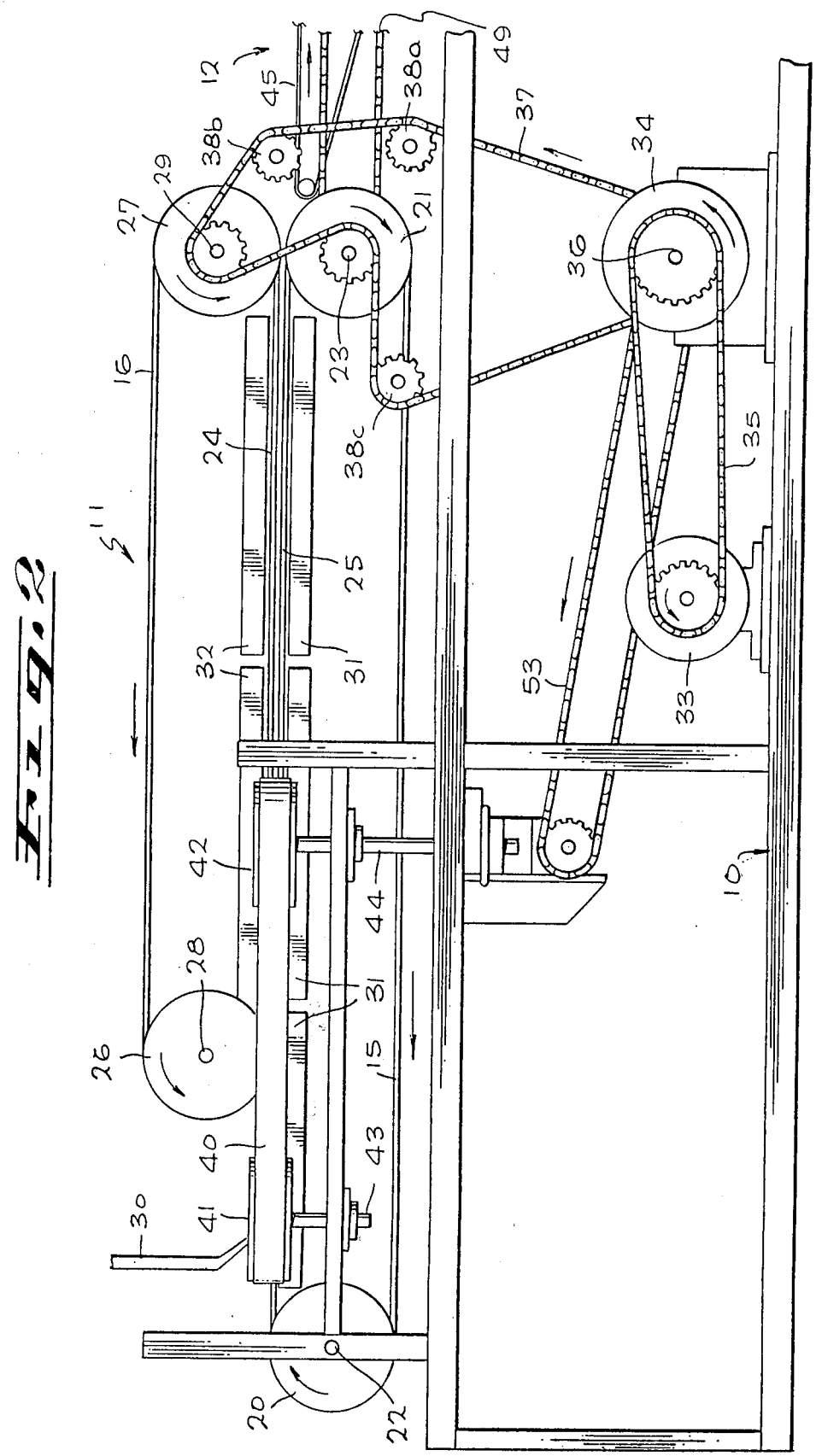
FIG. 2 is a side elevational view of means for forming a semi-liquid batter into a continuous baked sheet having a substantially uniform predetermined thickness.

In accordance with the present invention, the baked outer shell portion of the centerfilled product of this invention is formed from a batter which has as its principal ingredients mono-and/or disaccharides, flour, an edible fat or oil, egg white and water. These ingredients are mixed to provide a homogeneous semi-liquid batter which is formed into a relatively thin continuous layer of controlled thickness and heated to form a continuous elongated baked sheet or ribbon having a substantially uniform, predetermined thickness. The batter has a relatively high content of mono-and/or disaccharides, so that the baked sheet is thermoplastic, that is, it is soft, flexible and pliable when at a temperature above about 210° F., but becomes hard and rigid upon cooling. However, if reheated to a temperature above about 210° F., the baked sheet again becomes pliable and flexible. It is essential that the thickness of the batter layer be controlled during its formation and baking so that the finished baked sheet will have a thickness equal to the desired thickness of the baked outer shell portion of the centerfilled product of this invention. The thickness of the baked sheet will depend on the desired shell to filling ratio and overall tube diameter of the product, which affects the texture, flavor and mouthfeel of the product. Thus, the baked sheet has a substantially uniform thickness which may range from about 1/32" to ¼" or more, with a thickness in the range of between 1/16" to 5/32" being preferred, and has a bulk density of above 30 lbs. per cu. ft.

The thickness of the baked sheet is controlled by carrying a layer of the semi-liquid batter between a pair of heated moving surfaces which are vertically spaced apart a distance equal to the desired thickness of the baked sheet, with the heated surfaces moving in the same direction at the same linear speed. The batter may be retained between these moving heated surfaces until baking of the batter layer is completed, that is, until the batter layer has been baked into a continuous sheet having sufficient cohesion and strength to be self-supporting. Alternatively, the batter may be retained between these heated moving surfaces only until the surfaces of the batter layer have been set, so that the partially baked batter layer will retain this controlled thickness. The partially baked sheet, having a moisture content of about 15%–25% by wt., may then be transferred to a conventional baking means, such as a continuous band oven for completion of baking.

Baking of the batter layer is completed when its moisture content has been reduced to about 5% or less, preferably between 2%–3%. At this moisture level the baked sheet is sufficiently cohesive to form a continuous self-supporting sheet and has sufficient tensile strength, elasticity and pliability to enable the baked sheet to be rolled into a tubular shape having a longitudinal butted seam while warm, and to become rigid, crisp and friable upon cooling so that when cooled it retains its tubular shape, that is, there is no separation or opening of the butted seam.

The temperature at which the semi-liquid batter layer is baked to form the continuous sheet will depend upon the formulation of the batter and the desired thickness of the baked sheet, but should be at least 210° F. or above and usually is in the range from about 275° F. to 440° F.

The time of baking will depend on the thickness of the batter layer, the formulation of the batter and the baking temperature and may range from a few seconds to 10 minutes or more.

In the embodiment of the invention shown in FIG. 1, the semi-liquid batter is deposited in controlled amounts on a first or lower heated endless belt which carries the batter as it is heated and baked to form a continuous baked thermoplastic sheet. A second or upper endless belt having a heated lower run is disposed parallel to and overlies the lower endless belt, with the heated facing belt runs being vertically spaced apart so that a gap is provided between the opposed facing runs. The opposed facing belt runs are sufficiently proximate one another so that the batter is confined between the opposed runs to thereby gauge the thickness of the batter layer. Thus, the facing runs of the lower and upper endless belts, which move in the same direction at substantially the same linear speed, are vertically spaced apart a distance equal to the desired thickness of the baked shell portion of the product of this invention, that is, about 1/32" to ¼" or more. Heating units, such as radiant heaters, ribbon burners, and the like, are positioned adjacent the facing runs of both the upper and lower endless belts to heat the batter layer and bake it into a continuous sheet as it is carried by the lower belt. The speed of the belts and the baking temperature are coordinated so that the continuous baked sheet, at the completion of the baking step, will have a temperature of about 210° F. or above and a moisture content of no more than about 5% by weight, preferably between 2%–3% by weight. While a uniform temperature may be provided throughout this baking step, it is usually preferred to reduce the temperature in one or more steps as the batter layer is baked. This may be carried out by providing a plurality of heating units, which can be independently controlled in temperature, adjacent the facing runs of the belts. For example, at the start of the baking cycle, when the batter is first carried between the belts, the temperature is relatively high, e.g., 500° F., to facilitate rapid setting of the surfaces of the sheet. One or more intermediate temperature zones having a slightly lower temperature, e.g., 450° F., and a final heating zone at a lower temperature, e.g., 400° F. are provided to complete baking of the batter layer and reduce the moisture content of the baked batter layer to no more than about 5%.

Alternatively, the batter layer may be maintained between the vertically spaced heated endless belts to only partially bake the batter to the extent that the surfaces of the batter layer have been set, so that the partially baked batter layer will retain this controlled thickness. The partially baked sheet, having a moisture content of about 15%–25%, is then transferred to conventional baking means, such as a continuous band oven or the like for completion of the baking step in which the moisture content of the sheet is reduced to no more than about 5%.

The types and amounts of ingredients used in the batter are such that the baked sheet is thermoplastic, will maintain a uniform thickness, be sufficiently cohesive to form a continuous sheet, and have sufficient tensile strength, elasticity and pliability to enable the continuous baked sheet to be continuously rolled into a tubular shape while warm and to become rigid and friable upon cooling, so that the cooled tube retains its shape. As noted hereinabove, mono-and/or disaccharides, flour, and edible fat or oil, egg white and water are the principal ingredients of the batter. The batter has a relatively high content of mono-and/or disaccharides, that is, between about 15%-45% by weight, and preferably from about 30%-40% by weight, of the batter mix. Such a level of mono-and/or disaccharides in the batter provides the baked batter layer with a texture and structure such that it is thermoplastic, that is, the baked sheet is soft, flexible and pliable while at a temperature of about 210° F. and above, but becomes crisp, rigid and friable upon cooling. However, each time the baked layer is reheated to above about 210° F., it again becomes pliable and flexible. Suitable mono- and/or disaccharides which may be used include sucrose, fructose, dextrose, invert sugar, corn syrup solids, lactose, and the like. Generally, it is preferred to use cane or beet sugar in either powdered or granulated form.

The flour component may comprise from 10%-20% by weight of the batter mix, with amounts of between about 12% and 16% by weight being preferred. The flour may be derived from wheat, corn, rye, soy, barley, and the like, and mixtures thereof. Wheat flour is preferred.

Any of the edible animal and vegetable fats and oils generally used in baked foods may be used in the batter mix, including, for example, butter, lard, margarine and hydrogenated vegetable oil shortenings made from oils such as soybean oil, cottonseed oil, corn oil, peanut oil, coconut oil, palm oil and the like, and mixtures thereof. The fat or oil component may constitute from about 5%-15% by weight of the batter mix, with amounts of between about 10% and 13% weight being preferred.

Egg whites, which function as a binding material or toughener, are incorporated in the batter mix in either liquid, frozen or dry form (as egg white solids) in amounts of from about 2.5%-15% by weight of the mix. Water, or other aqueous liquids, is present in the batter mix in an amount sufficient to provide the batter with a semi-liquid consistency, generally constituting from about 15%-30% by weight of the batter mix. Of course, minor amounts of other ingredients may be incorporated in the batter mix, such as for example, salt, flavorings, emulsifiers, leavening agents, starch, lecithin and the like. The selection and quantity of such other ingredients will depend largely upon the character and texture desired for the end product.

In preparing the batter, the ingredients, except for the fat or oil and emulsifier (if used) are thoroughly mixed with water until all of the dry ingredients are moistened. Fat or oil and emulsifier are then added to the mix with agitation to provide a homogeneous batter having a semi-liquid consistency. As noted above, the batter is deposited as a continuous layer on heating and conveying means which heat and bake the batter layer to form a continuous baked sheet having a controlled thickness.

Generally it is preferred that the tubular centerfilled product of this invention have an outside diameter in the range of from about ⅜" to 1", depending on the intended use of the product, that is, a cookie, snack item, and the like. Accordingly, the baked batter layer must have a width at least sufficient to form a tube having the outside diameter desired in the finished product, when the sheet is rolled around its longitudinal axis and the edges of the sheet butted together. Thus, the width of the baked sheet which is rolled into a tube is equal to the circumference of the finished centerfilled product. When the semi-liquid batter is formed into a continuous layer and baked to form the thermoplastic sheet, the width of the batter layer being baked may be controlled to provide a continuous baked sheet having a width such that when the baked sheet is rolled around its longitudinal axis and the edges of the sheet butted together, it forms a tube having the desired outside diameter. Alternatively, a relatively wide layer of batter may be formed on the heated endless belt and baked to provide a continuous sheet which is subsequently cut into longitudinal strips upon completion of baking, such as by passing the baked sheet through a plurality of spaced rotary or stationary knives disposed at or near the discharge end of the conveyor on which the batter layer is carried during baking. Thus the baked sheet is cut into continuous longitudinal strips which have a width equal to the circumference of the finished centerfilled product.

When the continuous batter layer has been baked to the desired extent, i.e. until its moisture content has been reduced to about 5% or less, the resulting continuous sheet while still warm and pliable, is formed into a continuous tube having a longitudinal, non-overlapping or butted seam. Thus, the baked sheet, having the desired width, is transferred onto a flexible, deformable, forming conveyor belt which has its feed end located adjacent the discharge end of the endless belt on which the sheet is carried during its baking, and moves in the same direction and at the same linear speed as the endless baking belt. This forming conveyor belt carries the baked dough sheet, while warm and pliable, through a closed forming tube in which the continuous baked sheet is formed into a continuous cylindrical tube. As this belt, which is flexible and deformable, enters the forming tube, the lateral edges of the flat belt are progressively raised and the belt progressively curved until the edges of the belt meet to form a closed cylindrical tube. The pliable, thermoplastic baked sheet which is carried on the flexible forming belt conforms in shape to the shape of the belt and is also formed into a closed cylindrical tube with the longitudinal edges of the sheet butted together to provide the tube with a non-overlapping longitudinal seam.

The baked sheet has a moisture content of no more than about 5% and a temperature of at least about 210° F. when it is formed into a tubular shape, so that the baked sheet will be sufficiently pliable to be formed into a closed cylindrical tube without cracking of the sidewalls of the tube and will have sufficient cohesion and strength to hold together.

The cylindrical tube thus formed is confined until it has cooled to an extend to become sufficiently rigid to retain its tubular shape without opening or separation of the longitudinal seam. The baked cylindrical tube is retained in the forming tube until the baked batter has cooled to a temperature below about 200° F., preferably between about 95°-100° F. or below. Because of its relatively high mono-and/or disaccharide content, the baked batter is rigid, crisp and friable at such temperatures, so that upon cooling, the closed cylindrical tube retains its shape with no separation or opening of the closed longitudinal seam. In order to facilitate cooling of the baked batter tube, the forming tube through which the baked sheet is carried, is surrounded by a cooling jacket through which a refrigerant, such as cold water or glycol, is circulated.

An edible filling material is continuously deposited into the center of the baked tube as it is carried through the forming tube to fill the core of the tube. While the nature of the filling material may vary depending on the intended use of the product, it is generally preferred to use a viscous material such as confectionary creme, fruit paste, meat paste, cheese paste, and the like, which has a low water activity, and which has a visocity such that it is sufficiently fluid to be pumpable when warm but upon cooling will be sufficiently stiff and firm to be retained within the baked tubular shell. The viscous filling material is injected into the baked tubular shell at a point after the baked strip is rolled into tubular shape and the edges of the baked strip are butted together. This gives the baked material an opportunity to cool somewhat before the introduction of the filling, thereby eliminating problems which may arise relating to melting or thermal degradation of heat sensitive fillings. It also reduces the risk of filling material escaping from the tubular shell. This is accomplished by pumping the filling material through a center filling tube which extends axially into the forming tube to a point beyond that at which the edges of the baked strip are butted together. The filling material is introduced into the center of the cylindrical tubular shell at a velocity substantially equal to the velocity at which the tubular shell is carried through the forming tube, so that the center filling is continuous and uniform within the shell. Other edible filling materials such as, for example, dry granular powders and solid materials, may be filled into the core of the baked tube by suitable means.

According to an embodiment of the invention, a confectionary creme is filled into the center of a continuous, baked tube to provide a cylindrical, centerfilled cookie product. Such a filling material contains as its principal ingredients between about 20%–50% by weight of a sugar, such as granulated sugar, powdered sugar, brown sugar, dextrose, corn syrup solids, and the like, and combinations thereof, and between about 20%–40% by weight of an edible plastic animal or vegetable fat or oil, such as butter, lard, hydrogenated vegetable oil shortenings, and the like, and combinations thereof. Minor amounts of other ingredients, such as salt, flavoring, antioxidant, emulsifiers, and the like, may be included, if desired. In a preferred embodiment, a proteinaceous material is included in the sugar-fat mix to provide a protein fortified cookie product. Preferably, non-fat dry milk solids are incorporated in the sugar-fat mix in amounts up to about 40% by weight of the mix, usually between 10%–40% by weight. Other suitable protein source materials may also be used, such as, for example, sodium caseinate, calcium caseinate, vegetable protein isolates, and the like. Vitamins, minerals and other nutrients may also be included if desired. In preparing such a filling mix, the plastic shortening and emulsifier are melted and cooled to a temperature of about 100°–110° F. The cooled fat mixture is then combined with a blend of the dry ingredients (such as powdered sugar, nonfat milk solids, salts, etc.) in a mixer equipped with suitable agitating means until the texture is creamy and uniform. The mix then is pumped by a metering pump through an overrun control device that whips the filling mix until it becomes slightly stiff. The mix is then pumped through a filling tube which extends axially into the forming tube at the inlet end thereof to continuously deposit the filling in the baked tubular shell at a point after the tubular shell has been formed.

The continuous filled tube, after being cooled to a temperature below 200° F. is carried from the forming tube by the forming belt and is subsequently cut into pieces of desired length, say from about 1–3 inches, by any suitable cutting means such as a reciprocating knife, rotary cutting blade, high speed saw, guillotine knife, water knife, and the like, and packaged in suitable moisture-impermeable packaging material. The ratio by weight of the filling material to the baked dough shell in the finished product may range from about 0.33–1.5:1, depending on the nature and intended use of the product. The centerfilled product has a relatively high bulk density, on the order of about 10–50 lbs. per cu. ft., and has a water activity (Aw) of about 0.1–0.40.

Referring now more particularly to the drawings, FIGS. 2-4 illustrate one embodiment of the apparatus of the present invention, which includes a general frame 10 serving as a support and mounting for a batter layer forming and baking unit 11, tube forming and filling means 12 and cutting means 14.

The batter layer forming and baking unit 11 comprises a lower endless conveyor belt 15 on which the semi-liquid batter is deposited and carried as it is baked into a continuous sheet, an upper endless belt 16 disposed parallel to and vertically spaced a slight predetermined distance above lower conveyor belt 15 to gauge the thickness of the batter layer carried on belt 15, and heating means 31 and 32 disposed adjacent the facing runs of lower and upper belts 15 and 16 respectively to bake the batter layer as it is carried on the lower belt.

As shown in FIG. 2, lower endless conveyor belt 15 having a substantially horizontal upper run 25, extends longitudinally along the frame and extends around idler pulley 20 and drive pulley 21 at the feeding and discharge ends respectively of conveyor belt 15. Pulleys 20 and 21 are freely rotatable about shafts 22 and 23 which are horizontal and parallel to one another, the shafts being mounted in bearings (not shown) secured to the frame. Lower conveyor belt 15 preferably comprises an imperforate stainless steel band for suitable rigidity, although other suitable materials may be used.

Upper endless belt 16 having a substantially horizontal lower run 24 is disposed above conveyor belt 15, parallel thereto, with the lower run 24 of belt 16 being uniformly vertically spaced above the upper run 25 of the conveyor belt 15 a distance equal to the desired thickness of the baked shell portion of the product of this invention, generally a distance of between about 1/32" to ¼". Upper endless belt 16 extends around idler pulley 26 and drive pulley 27 which are mounted for rotation about horizontal shafts 28 and 29 respectively which are parallel to one another and mounted in bearings (not shown) secured to the frame.

As shown in FIG. 2, upper endless belt 16, which is made of the same material as the lower belt, overlies a substantial portion of lower conveyor belt 15, with the feed end of upper belt 16 being longitudinally spaced a short distance from the feed end of the lower conveyor belt. Disposed above the endless conveyor belt 15, intermediate the feed end of lower conveyor belt 15 and the feed end of upper belt 16 is nozzle 30 adapted to deposit a uniform predetermined amount of semi-liquid batter on the upper run 25 of conveyor belt 15. Feeding means (not shown) associated with nozzle 30, cooperate with the nozzle to deposit a continuous layer of the semi-liquid batter onto the upper run of belt 15 with the batter layer having a thickness at least equal to the desired thickness of the baked shell portion of the product of this invention.

Thus the upper run 25 of belt 15 and lower run 24 of belt 16 are axially aligned and vertically spaced apart to provide a gap between the facing belt runs, with the layer of semi-liquid batter being carried on the lower belt 15 into the gap to thereby gauge the thickness of the batter layer. Lower run 24 of belt 16 is sufficiently proximate to upper run 25 of belt 15 to contact the upper surface of the batter layer being carried on upper run 25.

One or more heating units 31 and 32 are mounted adjacent both facing belt runs 24 and 25 substantially the entire length of the facing belt runs. The heating units are adapted to heat the batter layer disposed between the facing runs and bake it into a continuous elongated sheet. Preferably a number of independently controlled heating units are mounted adjacent the facing runs 24 and 25, so that several temperature zones are provided over the length of the facing runs. However, in any given temperature zone, the heating units adjacent the upper and lower facing belt runs preferably have the same temperature. Any suitable heating means capable of heating the batter layer to a temperature of between about 275° F.–550° F. may be used, such as for example, gas burners, electrical heating coils, resistance heating elements, and the like.

Lower and upper endless belts 15 and 16 are driven by motor means 33 to move in the same direction at the same linear speed. Drive chain 35 connects the motor 33 to the main drive shaft 36 mounted in speed reduction means 34. Drive chain 37 connects the drive pulley 27 of the upper endless belt 16 and drive pulley 21 of the lower endless conveyor 15 with the main drive shaft 36 through idler sprockets 38a, 38b, and 38c, so that the upper belt 16 moves in the same direction as and uniformly with the lower conveyor belt 15 in the direction indicated by the arrows.

According to one embodiment of the invention, a vertically disposed endless belt 40, made of the same material as conveyor belt 15, is mounted adjacent both edges of the lower conveyor belt 15 at the feeding end thereof to confine the semi-liquid batter and thereby control the width of the semi-liquid batter on the lower conveyor belt. Thus, the vertical belts 40 extend from a point forward of nozzle 30 to a point where the semi-liquid batter has been baked sufficiently that it is no longer flowable. Each vertical belt extends around an idler pulley 41 and a drive pulley 42 which are freely rotatable about vertical shafts 43 and 44 respectively, the shafts being mounted in bearings attached to the frame. Drive chain 53 connects drive pulley 42 with the main drive shaft 36 so that the vertical endless belts 40 move in the same direction and at the same linear speed as lower and upper horizontal endless belts 15 and 16.

In this embodiment, both lower and upper belts 15 and 16 have a width substantially equal to the desired circumference of the tubular shell portion of the centerfilled product of this invention. Since the vertical endless belts 40 confine the edges of the batter layer, the baked batter layer will also have a width substantially equal to the desired circumference of the tubular shell.

If desired, endless belts 15 and 16, and the batter layer carried therebetween, may have a width substantially greater than the desired circumference of the tubular shell. In such event, a plurality of suitable cutting means, such as stationary or rolling knives (not shown) are provided at or near the discharge end of the baking means to cut the continuous wide baked sheet into continuous strips having a width substantially equal to the desired circumference of the tubular shell.

The lower and upper endless belts 15 and 16 may both have a length sufficient that the batter layer is completely baked (i.e., it has a moisture content of no more than 5%) when the batter layer reaches the discharge end of lower conveyor 15. Alternatively, the lower heated run 24 of upper endless belt 16 may overlie lower endless belt 15 only adjacent to the feed end of the lower belt a distance sufficient to gauge the thickness and heat the batter layer until it has become set, so that the batter layer will retain its set thickness. Thereafter, the batter layer may be heated only on the lower endless belt 15 or may be transferred to other conventional baking means such as a continuous band oven for completion of baking of the batter layer.

Located adjacent the discharge end of the baking unit 11 is the feed end of tube forming and filling means 12 which is adapted to receive the continuous baked batter sheet from conveyor belt 15. The tube forming and filling means 12 comprises a deformable, flexible endless conveyor belt 45 made of canvas, cotton, filled dacron or other suitable flexible and deformable material, arranged so as to have a substantially horizontal upper run 46 which is axially aligned and substantially co-planar with upper run 25 of endless conveyor belt 15. Thus, deformable endless belt 45 is disposed end to end in longitudinal line with endless conveyor 15, the deformable belt 45 having a feed end located adjacent the discharge end of lower endless conveyor 15 and adapted to receive from the lower endless conveyor the continuous baked sheet, with the baked sheet being transferred onto the upper run 46 thereof. Deformable endless belt 45 extends around idler pulley 47 and drive pulley 48 at the feed and discharge ends respectively. Pulleys 47 and 48 are rotatably mounted in bearings (not shown) mounted on the frame. Drive chain 49 connects the drive pulley 48 of flexible conveyor belt 45 with the drive pulley 21 of lower endless conveyor belt 15 so that the flexible conveyor belt 45 moves in the same direction and at the same linear speed as lower endless conveyor belt 15.

The upper run 46 of flexible belt 45, which carries the continuous baked sheet, passes through tubular member 50, which has a converging guide 51 at the inlet thereof, and through guide ring 52 which is secured to the frame 10 intermediate the discharge end of tubular member 50 and drive pulley 48. Tubular member 50 is surrounded by a cooling jacket through which a refrigerant such as cool water, glycol, and the like is circulated through inlet 55 and outlet 56. Tubular member 50 has a bore extending therethrough, the bore having a diameter which is substantially equal to the desired outside diameter of the centerfilled product of this invention, plus twice the thickness of the flexible belt, and which may be in the range of from about ⅜" to 1". Flexible conveyor belt 45 has a width which is substantially equal to the circumference of the bore which extends through tubular member 50. As the flexible conveyor belt moves through converging guide member 51 into the tubular member 50, the lateral edges of the flat belt are progressively raised and the belt progressively curved until the edges of the belt meet to form a closed cylindrical tube at a point adjacent the inlet end of the tubular member. The belt is retained in this tubular configuration until the belt moves through guide ring 52. The continuous baked thermoplastic sheet which is carried on belt 45 has a width substantially equal to the width of deformable belt 45. The baked sheet, as it is carried into tubular member 50, is at a temperature of about 210° F. or above so that it is flexible and pliable and will conform in shape to the shape of belt 45. Accordingly, as the baked sheet is carried by the flexible conveyor belt 45 through converging guide 51 into tubular member 50, the lateral edges of the sheet are progressively raised and curved until the edges of the sheet are butted together to form a closed cylindrical tube having a longitudinal butted or non-overlapping seam. As the cylindrical tube formed from the baked sheet is carried through tubular member 50 it is cooled to an extent that it becomes rigid and friable so that as the continuous baked tube is carried beyond guide ring 52 it is sufficiently rigid to retain its tubular shape without opening or separation of the longitudinal seam.

Filling tube 58 extends axially into the tubular member 50 at the inlet end thereof to a point beyond that at which the edges of the baked sheet are butted together to form the cylindrical tube, for continuously introducing a viscous edible filling material into the center portion of the tube. The filling material is pumped from metering cylinder 59 through the filling tube 58 into the center of the cylindrical baked tube at a velocity substantially equal to the velocity at which the baked tube is carried through tubular member 50 so that the center filling is continuous and uniform and completely fills the core of the baked tube. As the centerfilled tube is carried through tubular member 50 it is cooled sufficiently that the filling material becomes firm and is retained within the tubular shell.

As the continuous centerfilled tubular product is discharged from flexible conveyor belt 45 it is cut into pieces of desired length by suitable cutting means 14 provided at the discharge end of belt 45, and the cut pieces packaged in any suitable packaging material.

As seen in FIGS. 5 and 6, the product of this invention comprises a rigid, tubular baked shell 64 which surrounds and encases a core 65 of edible material, the tubular shell having a longitudinal, non-overlapping butted seam 66.

FIGS. 8-11, illustrate an embodiment of the apparatus of this invention in which the semi-liquid batter is retained between the heated moving surfaces only until the surfaces of the batter layer have been set, and in which the baked sheet is cut into a plurality of continuous, longitudinal strips each of which is formed into a separate continuous tube. This embodiment of the invention includes a forward frame 70 supporting a batter layer forming unit 71, and an end frame 72 which supports tube forming and filling means 73, and cutting and packaging means 74. Baking unit 75 is interposed between the forward and end frames 70 and 72.

As shown in FIGS. 8 and 10, the batter layer forming unit 71 comprises a pair of opposed, vertically spaced apart, axially aligned, heated endless belts 76 and 77. Thus, lower endless belt 76, which has a substantially horizontal upper run 80, extends longitudinally along frame 70 around idler roll 81 and drive roll 82, which are mounted for free rotational movement on shafts 83 and 84, respectively, which are horizontal and parallel to one another and appropriately journaled on frame 70. Upper endless belt 77, which has a substantially horizontal lower run 85 extends around idler roll 86 and drive roll 87, which are mounted for free rotational movement on shafts 88 and 89, respectively, and appropriately journaled on frame 70. The belts 76 and 77 are so mounted on the frame that the facing runs 80 and 85 are parallel and are vertically spaced apart a distance equal to the desired thickness of the baked shell portion of the centerfilled product, usually between 1/32" to ¼". Belts 76 and 77 preferably are both formed of imperforate steel for rigidity. While the belts may be coextensive in width, lower belt 76 preferably has a width slightly greater then upper belt 77. Lower endless belt 76 has a greater length than upper endless belt 77, with the belts being arranged so that the upper belt overlies about the final two-thirds of the lower belt, with the discharge ends of the belts being substantially co-terminus. Lower and upper endless belts 76 and 77 are driven by the same or separate motor means so that their facing runs move in the same direction at the same linear speed. Thus, rolls 81 and 82 on which lower endless belt 76 is mounted, are rotated in a clockwise direction by a conventional motor and speed reducer 90 by means of a conventional drive, such as sprocket 91 mounted on shaft 84 coacting with driving chain 92 to move the upper run 80 in a left-to-right direction as seen in FIG. 8. Rolls 86 and 87, on which the upper endless belt 77 is mounted, are rotated in a counter-clockwise direction so that lower run 85 also moves in a left-to-right direction as seen in FIG. 8. Drive chain 93 which extends around sprocket 94 mounted on shaft 84, idler sprockets 95a and 95b and sprocket 99 mounted on shaft 89 so that upper belt 77 will be driven at a linear speed substantially equal to that of lower belt 76.

The facing runs 80 and 85 of the lower and upper endless belts 76 and 77 are heated by one or more heating units 78 and 79 mounted adjacent facing belt runs 80 and 85 respectively and which extend over a substantial portion of the length and width of the facing belt runs. Any suitable heating means may be used, including gas burners, electrical heating coils, resistance heating elements, and the like, which are capable of heating the belts to a temperature sufficient to heat the batter layer carried between the facing belt runs to a temperature of between about 250° F.-550° F.

Upper and lower belts 77 and 76 have a width sufficient to permit the formation of a batter layer from which a plurality, for example 10 to 12, tubular shell portions of the center-filled product may be formed. One or more nozzles 96 are disposed above the upper run 97 of upper endless belt 77 and are adapted to deposit a continuous layer of the semi-liquid batter, in the form of one or more wide strips, onto upper run 97, with the batter layer having a substantially uniform thickness and extending across a substantial portion of the width of endless belt 77. For example, when an upper endless belt having a width of about 26 inches is used, two strips of batter, each about 12 inches wide are deposited on the upper run of the belt. Semi-liquid batter is supplied to the nozzle 96 by any suitable feeding means (not shown). The semi-liquid batter layer is carried on upper run 97 of endless belt 77 in the direction shown by the arrows, around the outer surface of roll 86 and between the facing runs of belts 76 and 77 to gauge the thickness of the batter layer and heat the batter layer. The speed of the belts and the temperature of heating units 78 and 79 are coordinated so that as the batter layer is carried between the facing runs, the batter layer is partially baked, with the surfaces of the batter layer being set so that the batter layer will retain its gauged thickness. As the continuous partially baked batter layer, which has a moisture content of about 15%–25%, is moved beyond the discharge end of endless belts 76 and 77, it is transferred onto the upper run of transfer conveyor 98 which is positioned adjacent and in direct frontal alignment to lower endless belt 76 throughout its entire width and is then carried into baking unit 75, such as a conventional tunnel type band oven, for completion of baking of the batter layer. Since the baking unit is of conventional design only a fragmentary portion of it is shown in the drawings. Thus, the partially baked batter layer is transferred onto an endless conveyor belt 100 composed of a heat resistant material such as metallic screening, and carried on belt 100 through the tunnel band oven for completion of baking. Conveyor belt 100 is driven by suitable motor means (not shown) and moves at the same linear speed as endless belts 76 and 77. The speed of belt 100 and the temperature of the oven, which may range from about 275° F. to about 450° F., are coordinated so that the continuous baked sheet, at the completion of baking, will be at a temperature of about 210° F. or above and will have a moisture content of no more than about 5% by weight, preferably between 2%–3% by weight.

Referring now to FIGS. 9 and 11, transfer belt 101 adapted to receive the continuous baked sheet discharged from the oven is positioned adjacent the discharge end of endless belt 100 in direct frontal alignment with belt 100 throughout its entire width, with the upper run of transfer belt 101 being substantially co-planar with the upper run of belt 100 on which the batter layer is carried during baking. The baked sheet is then cut into a plurality of continuous longitudinal strips, each having a width equal to the desired circumference of the finished centerfilled product. Thus, a plurality of circular knives 102 secured to rotatable shaft 103 are arranged in parallel, spaced relation across the frame adjacent transfer belt 101, with the knives 102 being rotated in a clockwise direction by driven gears 104. As the baked sheet moves forward from transfer belt 101 through the circular knives, it is cut into a plurality of continuous longitudinal strips, with the sheet being retained against flexion by roller 105 which is mounted transversely of the frame above and parallel to the knives. Roller 105 is rotated in a counter-clockwise direction by driven gears 106, with the knives and roller both being rotated at the same speed as that of endless belt 100.

A tube forming and filling means 73 is provided for and is longitudinally aligned with each of the longitudinal strips thus formed, with the feed end of the tube forming and filling means being mounted in close proximity to the knives 102. Each of the tube forming and filling means 73 is substantially the same in structure, function and operation as the tube forming and filling means 12 described hereinabove in FIGS. 3, 4 and 7. Thus, each unit includes a deformable, flexible, endless conveyor belt 110 longitudinally aligned and substantially co-planar with each longitudinal strip formed by passage of the baked sheet through knives 102, which trains over rear idler roller 111, mounted for free rotational movement on end frame 72, and over front drive roller 112. The front drive roller 112 is mounted on drive shaft 113 driven by a suitable power source (not shown) and is adapted to move flexible conveyor belt 110 in the direction indicated by the arrows at the same linear speed as endless belts 76 and 77. The upper run of flexible belt 110, on which the continuous flexible baked strips are carried, passes through a tubular member 114 which is supported at both ends by brackets 115 secured to frame 72. Each tubular member 114 is surrounded by a cooling jacket through which a coolant is circulated through inlet 116 and outlet 117. As a flexible baked strip is carried by a flexible belt 110 through a tubular member 114, the lateral edges of the continuous strip are progressively raised and curved until the edges of the strip are butted together to form a closed cylindrical tube having a longitudinal butted seam.

A filling tube 118 extends axially into each of the tubular members 114 to a point beyond which the edges of the baked longitudinal strip carried on the flexible belt are butted together to form the continuous tube. A viscous edible material is pumped from a mixer (not shown) by conventional pumping means through each of the filling tubes 118 into the center of the closed tubular shell at a rate consistent with the rate of travel of the baked strips through the tubular member so that the center filling is uniform and continuous and completely fills the core of the baked tube.

Thus, when the longitudinal strips formed by passage of the baked sheet through the knives 102 are transferred onto the flexible belt 110 the strips are at a temperature of 210° F. or above so that the thermoplastic strips are in a flexible and pliable state. As the flexible strips are carried on belt 110 through tubular member 114 the lateral edges of the strip are raised and curved until they are butted together to form a closed cylindrical tube, at which point the filling material is pumped into the core portion of the tube. As the continuous tube formed from the baked sheet is carried through tubular member 114 it is cooled to such an extent that the baked shell becomes hard, rigid and friable and the filling sets up sufficiently to be retained within the tubular shell, at which point the filled continuous tube is discharged from tubular member 114.

A cylindrical guide member 120 is mounted on end frame 72 adjacent the discharge end of each flexible conveyor belt 110, with each guide member 120 being longitudinally aligned and substantially co-planar with the adjacent flexible conveyor belt. As the continuous rigid tube is discharged from the flexible conveyor, it enters guide member 120 and is cut into pieces of desired length by any suitable means, such as water jets 121 mounted on end frame 72 above each guide means. After cutting, the pieces of the centerfilled tubular product are packaged in any suitable manner in moisture impermeable packing material. For example, the cut pieces may be carried on ramp 122 into packaging 123.

The invention will be disclosed with more particularity in the following example, which is intended to illustrate the present invention.

EXAMPLE

A tubular centerfilled food product was made using the apparatus shown in the accompanying drawings. A semi-liquid batter was prepared from the following ingredients:

|  | Percent by wt. |
| --- | --- |
| Sugar | 35.5 |
| Wheat Flour | 13.5 |
| Shortening | 11.5 |
| Cocoa | 9.0 |
| Egg white solids | 3.4 |
| Pregelatinized corn starch | 2.5 |

-continued

|  | Percent by wt. |
|---|---|
| Leavening | 1.6 |
| Salt | 0.5 |
| Emulsifier | 0.5 |
| Water | 22.0 |

In preparing the batter the dry ingredients were thoroughly mixed and the water added to the mix. The emulsifier and shortening were then added with agitation to form the batter.

The semi-liquid batter was deposited as a continuous layer on the upper heated run of a lower, imperforate stainless steel endless belt 1¾" wide. A vertical, imperforate stainless steel belt, approximately 1" wide, was provided adjacent both lateral edges of the lower endless belt to contain the semi-liquid batter on the lower belt. An upper imperforate stainless steel endless belt, also 1¾" wide, was disposed above the lower endless belt with the lower run of the upper belt being vertically spaced ⅛" above the upper run of the lower endless belt. The batter layer was carried on the lower endless belt into the gap between the facing belt runs to provide the batter layer with a uniform thickness of ⅛". Heating units disposed adjacent the facing belt runs heated the batter layer to a temperature of about 400°–500° F. as it was carried on the lower endless belt, with the batter layer being retained between the heated belt runs until the moisture content of the batter layer was reduced to about 3%.

The continuous baked sheet, 1¾" wide × ⅛" thick, was transferred from the lower endless belt to a flexible dacron endless belt, also 1¾" in width, disposed end to end in longitudinal line with the lower endless belt, and carried on the flexible endless belt through a forming tube having an internal diameter of 9/16". The baked sheet carried on the flexible belt had a temperature of above 210° F. as it entered the forming tube. As it was carried through the forming tube, the lateral edges of the baked sheet were progressively raised and curved until the edges were butted together to form a continuous tube having a longitudinal non-overlapping seam.

An edible filling material was prepared from the following ingredients:

|  | Percent by wt. |
|---|---|
| Sugar | 40.0 |
| Shortening | 30.0 |
| Non-fat dry milk | 20.0 |
| Butterfat | 7.5 |
| Emulsifier | 2.2 |
| Salt | 0.2 |
| Flavor, antioxidant | 0.1 |

In preparing the filling, the dry ingredients were thoroughly mixed and added to a mixture of fat and emulsifier, which was at a temperature of about 100°–110° F. The resulting mix was whipped until it became slightly stiff. The filling was then pumped through a filling tube which extended axially into the forming tube to continuously deposit the filling material into the core of the tube of baked batter, with the filling being injected at a point after the edges of the baked sheet had been butted together. The filled tube was retained in the forming tube until the temperature of the shell was reduced to below 150° F. so that the shell was rigid and friable.

The cooled filled tube was then carried on the flexible belt from the forming tube to cutting means which cut the continuous filled tube into pieces about 3" in length.

The centerfilled product thus produced had an outside diameter of 9/16" with a baked shell thickness of ⅛". The filling material completely filled the core of the tube. There was no opening or separation of the longitudinal butted seam of the cooled shell.

While the invention has been described and illustrated with reference to a particular preferred embodiment, it is to be understood that this is only illustrative and not intended to limit the scope of the invention. Rather, the invention encompasses modifications, variations and rearrangements of parts which fall within the scope of the appended claims.

What is claimed is:

1. An apparatus for the continuous, straight-through production of a tubular centerfilled food product having an edible baked thermoplastic shell and a core of an edible filling material which comprises a pair of opposed endless belts having their facing runs vertically spaced apart a distance equal to the desired thickness of the baked shell portion of said product, means for depositing a layer of a semi-liquid batter onto one of said endless belts, means for moving the facing runs of said belts in the same direction at the same linear speed whereby said batter layer is carried between the facing runs of the opposed belts to gauge the thickness of said batter layer, heating means associated with said endless belts adapted to heat the endless belts whereby the batter layer carried between the facing runs of said endless belts is heated and its moisture content is reduced to provide a continuous pliable thermoplastic sheet having a set, controlled thickness, tube forming means including a cylindrical tube adapted to receive the continuous thermoplastic sheet while in a pliable state and roll the sheet around its longitudinal axis until the edges of the sheet are butted together to form a continuous, closed cylindrical tube having a longitudinal, non-overlapping seam, filling means extending into said cylindrical tube to a point beyond which the edges of the sheet are butted together for introducing an edible filling material into the core of said closed cylindrical tube, cooling means adapted to cool the closed cylindrical tube and cutting means adjacent the cylindrical tube means for cutting the continuous filled tube into pieces of desired length.

2. The apparatus defined in claim 1 in which said pair of endless belts comprise first endless conveyor belt means having a feed end, a discharge end and a substantially planar upper run and adapted to carry a layer of batter on said upper heated run to the discharge end of said first conveyor means, second endless belt means having a substantially planar lower run, said runs being opposed and vertically spaced apart to provide a uniform gap therebetween with the lower run of said second belt means overlying at least a portion of the upper run of said first conveyor means adjacent the feed end thereof, said batter depositing means being located intermediate the feed end of said first conveyor means and said second belt means, said supply means being operable to deposit a continuous layer of batter on the upper run of said first conveyor belt means, said heating means for heating said upper and lower runs being located so as to provide opposed baking surfaces for said batter layer whereby the continuous batter layer carried therebetween is baked into a continuous sheet having a substantially uniform thickness equal to the vertical spacing between said heated runs, and means adapted to move said upper and lower runs in the same direction at the same linear speed.

3. The apparatus defined in claim 2 in which said heating means is adapted to heat said upper and lower heated runs to a temperature in the range of between about 275° F.-550° F.

4. The apparatus defined in claim 2 in which a substantially vertical endless belt is disposed adjacent each edge of said first endless conveyor means at the feed end thereof, said vertical endless belts being moved in the same direction and at the same linear speed as the opposed upper and lower runs of said first and second endless belt means.

5. The apparatus defined in claim 2 in which said tube forming means comprises a flexible, deformable endless conveyor having a substantially planar upper run disposed end to end in longitudinal line with said first endless conveyor means, the deformable conveyor having a feed end located adjacent the discharge end of said first endless conveyor and adapted to receive from the first endless conveyor the continuous pliable baked sheet and carry said sheet at the same linear speed as said first endless conveyor means, a tubular member longitudinally disposed around the upper run of said deformable endless conveyor between the feed end and the discharge end of said conveyor, the tubular member having a bore through which the upper run of said deformable endless conveyor extends to carry the continuous pliable baked sheet through the tubular member, and adapted to progressively raise and curve the edges of the continuous pliable baked sheet carried on said deformable conveyor until the edges of the sheet are butted together to thereby form a continuous closed cylindrical tube having a longitudinal, non-overlapping seam, and said cooling means including a cooling jacket surrounding said tubular member.

6. The apparatus defined in claim 5 in which the filling means comprises an elongated tube extending axially into said tubular member and adapted to continuously deposit a measured amount of edible filling material within the core of the baked tube at a point after the edges of the baked sheet are butted together.

7. The apparatus defined in claim 5 in which the deformable endless conveyor and the continuous baked sheet carried thereon have a width equal to the circumference of the bore extending through the tubular member.

8. The apparatus defined in claim 1 in which baking means are provided intermediate said heating means and tube forming means, said baking means including an endless baking belt adapted to receive the continuous thermoplastic sheet from said heating means and second heating means adapted to bake the sheet to a moisture content of no more than about 5% by weight, with the baked sheet being continuously passed from said endless baking belt into said tube forming means.

9. The apparatus defined in claim 8 in which said pair of opposed endless belts have a width substantially greater than the circumference of the baked shell portion of the tubular product, and cutting means, adapted to cut the baked sheet into a plurality of longitudinal strips, are provided intermediate the discharge end of said endless baking belt and the tube forming means.

10. The apparatus defined in claim 9 in which said cutting means comprises a plurality of spaced, parallel circular knives extending transversely across said endless baking belt adjacent the discharge end of said belt, said knives being adapted to cut the baked sheet into a plurality of longitudinal strips, each of which have a width substantially equal to the circumference of the bore extending through said tubular member.

11. The apparatus defined in claim 9 in which a tube forming means is provided for and longitudinally aligned with each of the longitudinal strips, said tube forming means having its feed end mounted in close proximity to said circular knives.

12. The apparatus defined in claim 1 in which said pair of endless belts comprises a lower endless belt having planar, heated, upper and lower runs, an opposed upper endless belt having planar, heated, upper and lower runs, axially aligned with and overlying a portion of said lower belt, with the discharge ends of said upper and lower belts being substantially co-terminus, the lower run of said upper belt and the upper run of said lower belt being in facing relationship and vertically spaced apart a distance of about 1/32" to ¼", said batter depositing means are positioned over the upper run of the upper endless belts, the heating means and means for moving the facing runs of the belts are adapted to heat the batter layer sufficiently to partially bake the batter layer and reduce its moisture content to between about 15%–25% by weight when it is discharged from between said facing runs, and an endless baking belt longitudinally aligned with said upper and lower endless belts, positioned adjacent the discharge end of said upper and lower endless belts, said baking belt being adapted to receive the partially baked batter layer discharged from between said facing runs and carry the batter layer through a tunnel oven in which the batter layer is heated to reduce its moisture content to no more than about 5%.

13. The apparatus defined in claim 11 in which said tube forming means comprises a flexible, deformable endless conveyor having a substantially planar upper run disposed adjacent and in longitudinal alignment with said endless baking belt, the deformable conveyor having a feed end located adjacent the discharge end of said endless baking belt and adapted to receive from said endless baking belt a continuous longitudinal strip and carry said strip at the same linear speed as said endless baking belt, a tubular member longitudinally disposed around the upper run of said deformable endless conveyor between the feed end and the discharge end of said conveyor, the tubular member having a bore through which the upper run of said deformable endless conveyor extends to carry the continuous longitudinal strip through the tubular member, and adapted to progressively raise and curve the edges of the continuous longitudinal strip carried on said deformable conveyor until the edges of the strip are butted together to thereby form a continuous closed cylindrical tube having a longitudinal, non-overlapping seam, and said cooling means including a cooling jacket surrounding said tubular member.

14. The apparatus defined in claim 11 in which the filling means comprises an elongated tube extending axially into each of said tube forming means and adapted to continuously deposit a measured amount of edible filling material within the core of the continuous cylindrical tube at a point after the edges of the baked sheet are butted together.

15. The apparatus defined in claim 13 in which the deformable endless conveyor and the continuous baked sheet carried thereon have a width equal to the circumference of the bore extending through the tubular member.

* * * * *